W. P. VOTH.
WINDING AND UNWINDING APPARATUS.
APPLICATION FILED OCT. 18, 1920.
1,398,984.
Patented Dec. 6, 1921.
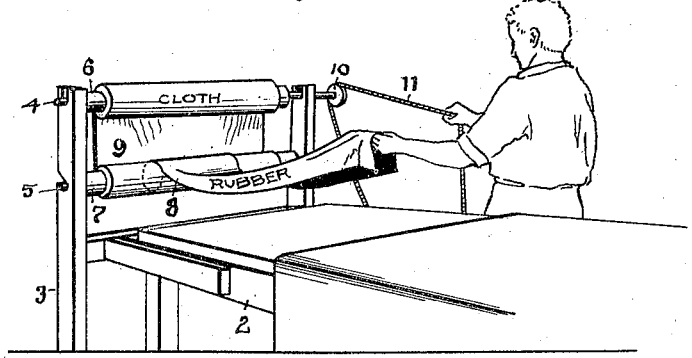
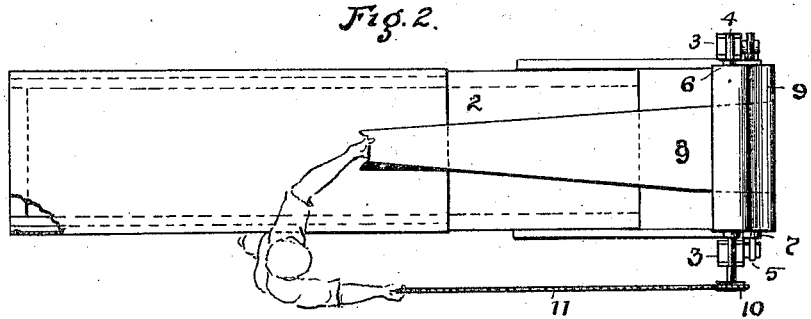
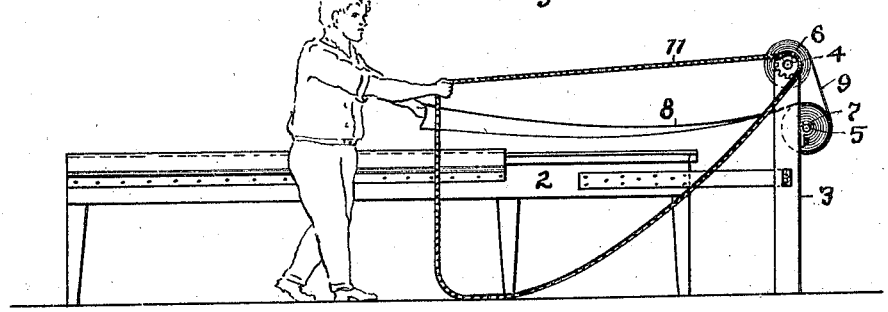
Inventor
W. P. Voth

UNITED STATES PATENT OFFICE.

WALTER P. VOTH, OF WILLOUGHBY, OHIO.

WINDING AND UNWINDING APPARATUS.

1,398,984.  Specification of Letters Patent.  Patented Dec. 6, 1921.

Application filed October 18, 1920. Serial No. 417,663.

*To all whom it may concern:*

Be it known that I, WALTER P. VOTH, a citizen of the United States, residing at Willoughby, in the county of Lake and State of Ohio, have invented certain new and useful Improvements in Winding and Unwinding Apparatus, of which the following is a specification.

This invention relates to winding and unwinding apparatus, which has been found to simplify and expedite and lessen the cost of manufacture of rubber inner tubes or pneumatic tires, and the invention comprises means whereby a single person or workman may with facility and despatch unwind a sheet of uncured rubber from the folds of a roll of protecting lining of cloth without stretch- or distorting the uncured rubber, and concurrently therewith wind the said lining upon a second roll rotated and under the control of the same individual or operator having hold of and guiding the rubber sheet over a work table preparatory to cutting and forming a tube from the rubber sheet.

In the drawing accompanying this application, Figure 1 is a perspective view of my improved unwinding and winding apparatus as it appears in operation, and Figs. 2 and 3 are plan and side elevations respectively of said apparatus.

As herein disclosed, the invention comprises a work table 2 having posts or standards 3 at one end adapted to removably support the respective journals or shafts 4 and 5 of a pair of rollers 6 and 7, one above the other. Roller 7 is employed to support a roll of uncured sheet rubber 8 within the folds or windings of a strip or lining of cloth 9. In practice the rubber sheet consists of uncured stock which is wound upon rolls 7 directly from the milling machines, and it should be understood that when the sheet is in that condition it is easily distorted or pulled out of shape.

In making tubes in a tire factory it is necessary to unwind a given length of this sheet of rubber from the liner roll upon a work table where it can be flattened and cut and folded into tubular form. The length required corresponds to the standard sizes of the inner tubes or rubber tires in common use, which means that the rubber sheet must be extended five to seven feet over the table, and heretofore it has been the practice to employ two men to unwind the rolls,—one to carry the rubber sheet over the table and the other to unwind roll 7 and wind up the cloth upon the second roll 6. In this proceeding the two men must necessarily coordinate their movements to accomplish the desired result without injury to the thin uncured rubber sheet. With my invention I eliminate the need of two men and bring the control and operation of this work entirely within the hands of one man. Thus, I attach or affix a sprocket pinion 10 on shaft 4 of roll 6 and suspend an endless sprocket chain 11 therefrom, and this chain is relatively long and free and flexible so that it may be carried or extended lengthwise of table 2 by the operator with one hand while grasping and carrying the rubber sheet with the other hand during such interval of time as the operator may take to walk to the opposite end of the table. In so doing roll 6 is continuously rotated and the strip of fabric 9 is wound up as fast as the rubber sheet is unwound from the folds of the fabric on roll 7, but inasmuch as the combined rubber sheet and lining on roll 7 is of greater diameter at the beginning of the operation than the goods on roll 6 there is necessarily a differential rotation between the rolls. With my invention a single operator working as herein described has a positive and sensitive control of the dual operation involved and when the proper length of rubber sheet has been unwound and laid upon the table he can release and drop chain 11 and proceed with the work of cutting and shaping of the sheet without any further attention to the rolls, and without restoring or resetting any operating mechanism. Thus when he desires to repeat the operation and unwind another section or length of rubber sheeting it is only necessary for him to walk up to the front end of the machine grasp the chain with one hand and the free end of the rubber sheet with the other and walk to the opposite end of the table as in the former instance. As shown the chain is connected to hang free from sprocket wheel 10 until it is picked up and drawn taut by the operator, and as the operator walks backward the sagging section of the chain is gradually taken up and its weight aids in maintaining working engagement of the chain with the sprocket wheel. This mode of affording a running engagement and continuous operation of roll 6 while the operator is shifting his position lengthwise of the table is a very simple and effective arrangement, but I do not desire to limit myself to merely the use of a chain in this connection. Thus, any equivalent construction which will permit a single operator to rotate the rolls and withdraw the sheet under his own control while moving lengthwise of the table falls within the purview and scope of my invention, and the appended claims in their broadest aspect are to be so construed.

What I claim is:

1. An apparatus for unwinding rubber or other stock from liner rolls, comprising a table and a pair of rolls and operating means for said rolls extending and movable in itself lengthwise of the table where both the stock and said means may be held and controlled by a single operator walking lengthwise of the table.

2. An apparatus for unwinding rubber or other stock from liner rolls, comprising a table, a pair of rolls for unwinding and winding the stock and lining material, and a wheel having a flexible operating connection therefor at one side of said table adapted to be extended lengthwise of said table to operate said rolls.

3. A table and rollers removably supported thereon adapted to wind a strip of cloth from one upon the other and to deliver a sheet of rubber upon the table from the folds of cloth upon one roller, and a traveling device connected with one of said rollers adapted to permit a single individual to convey the sheet of rubber over the table and to move said device together and rotate said rollers concurrently.

4. A table having a pair of rollers transversely thereof, one of said rollers having a strip of stock material wound within the folds of a strip of protecting material connected with and adapted to wind upon the other roller, and a horizontally traveling connection for said winding roller extending lengthwise of said table.

5. An apparatus for unwinding sheet rubber from a roll of protecting goods, comprising a roller adapted to wind up the said goods, and a sprocket wheel and a relatively long endless chain in free-running suspensory connection with said wheel.

Signed at Willoughby, in the county of Lake, and State of Ohio, this 18 day of September, 1920.

WALTER P. VOTH.